United States Patent [19]

Mazdiyasni et al.

[11] 3,917,780

[45] Nov. 4, 1975

[54] PREPARATION OF LEAD LANTHANUM ZIRCONATE TITANATE BODIES

[75] Inventors: Khodabakhsh S. Mazdiyasni, Xenia; Leanne M. Brown, Brookville, both of Ohio

[73] Assignee: The United States of America as represented by the Secretary of the Air Force, Washington, D.C.

[22] Filed: Aug. 9, 1973

[21] Appl. No.: 386,925

[52] U.S. Cl. .................... 264/61; 252/62.9; 264/66
[51] Int. Cl.$^2$ ........................................ C04B 35/26
[58] Field of Search ................ 252/62.9; 264/61, 66

[56] References Cited
UNITED STATES PATENTS

| | | | |
|---|---|---|---|
| 3,699,044 | 10/1972 | Dosch et al. | 252/62.9 |
| 3,718,723 | 2/1973 | Fraser et al. | 252/62.9 |

OTHER PUBLICATIONS

Jaffe, et al., *Piezoelectric Ceramics*, Academic Press, Inc., (1971) –p. 253,256, 259–260.
Brown et al., "Sintering of Alkoxy–Derived PLZT," J. Am. Cer. Soc., 55 p. 541–544.
Mojdic et al., "Use of Isostatic Pressing in Shoping of Refractory Components," Keram., 58[10]598–600 (1971) –abstract enclosed.
Snow, "Fabication of Transparent Electrooptic PLZT Aromis by Atmosphere Sintering," J. Am. Cer. Soe., 56 [2]p. 91–96 (1973).
Joffe et al., Piezoelectric Ceramics, p. 253–260 (1971).

*Primary Examiner*—Donald J. Arnold
*Assistant Examiner*—John Parrish
*Attorney, Agent, or Firm*—Joseph E. Rusz; Cedric H. Kuhn

[57] ABSTRACT

Theoretically dense, translucent or transparent, polycrystalline lead lanthanum zirconate titanate (PLZT) bodies are prepared by cold pressing calcined, alkoxy-derived PLZT powder and then sintering the resulting body in an oxygen atmosphere at a temperature below 1200°C for about 4 to 8 hours. The polycrystalline quaternary ceramic bodies are useful as ferroelectric, antiferroelectric and/or electrooptic materials.

4 Claims, No Drawings

PREPARATION OF LEAD LANTHANUM ZIRCONATE TITANATE BODIES

RIGHTS OF THE GOVERNMENT

The invention described herein may be manufactured and used by or for the Government of the United States for all governmental purposes without the payment of any royalty.

FIELD OF THE INVENTION

This invention relates to a method for preparing ceramic compacts possessing electrical and electrooptical properties. In one aspect it relates to polycrystalline quaternary ceramic bodies that are useful as ferroelectric, antiferroelectric and/or electrooptic materials.

BACKGROUND OF THE INVENTION

In recent years significant advances have been made in the development of polycrystalline piezoelectric lead zirconate titanate and electrooptic lead lanthanum zirconate titanate (PLZT) materials. The development of polycrystalline ternary, and more particularly quaternary, electronic ceramic bodies, which will transmit incident light, was not possible until the methods of controlling stoichiometry, inpurity content, porosity and grain size were sufficiently advanced to produce a body with a microstructure possessing optimized minimal light scattering and absorption parameters. The first such fully transparent electrooptic material found in the lanthana-doped lead zirconate titanate system was reported by Haertling and land in Journal of American Ceramic Society, 54, 1–11 (1971) and by Haertling in Journal of American Ceramic Society, 54, 303–309 (1971). As described in each of these articles, the PLZT ceramic bodies were prepared from the oxides of Pb, La, Zr and Ti, employing hot pressing techniques. In Ferroelectrics, 3, 296–280 (1972), Haertling and land disclose PLZT ceramics having improved optical and electrooptical properties resulting from the use of PLZT powder in producing the ceramic bodies. In the process used in preparing the powder, lead oxide, zirconium and titanium butoxides and isopropyl alcohol are mixed in a blender for about 1 minute. While continuing to mix these materials a solution of lanthanum acetate is added and the mixing is continued for 15 minutes. At the end of this period, the blended slurry is poured into a tray and dried in an oven at 100°C for about 4 hours. After removal of the dried product from the tray, it is crushed, placed in an alumina crucible and calcined at 500°C for 16 hours. After the calcination, the resulting powder is milled for 4 hours in acetone and then subjected to a second calcination at 500°C for 4 hours. In fabricating ceramic bodies, a preform slug is initially formed by cold pressing the calcined powder at about 3000 psi. The slug is then placed into the cavity of an alumina lined SiC mold and completely surrounded by magnesia grain. The mold is placed in a furnace wherein the slug is hot pressed. Typical conditions for hot pressing are stated to be 1200°C for 16 hours at 3000 psi. After cooling of the mold, the hot pressed slug is removed therefrom by using a diamond core drill. Magnesia grain clinging to the faces of the slug are removed, and the slug is sliced into discs.

From the foregoing description, it is seen that the prior art procedure for preparing PLZT ceramic bodies is time consuming and difficult to practice. Furthermore, the hot pressing method requires the use of high temperatures for extended periods of time, conditions that are detrimental to the stoichiometry of the ceramics. Thus, because lead oxide is very volatile, it is very difficult to maintain the composition of the ceramics during hot pressing.

It is an object of this invention, therefore, to provide an improved method for fabricating PLZT ceramic bodies.

Another object of the invention is to provide a method for preparing PLZT ceramic compacts that is less cumbersome and more economically feasible as compared to the prior art hot pressing technique.

A further object of the invention is to provide a method for preparing high density piezoelectric and electrooptic ceramic bodies that utilizes alkoxy-derived PLZT powder as the starting material.

Other objects and advantages of the invention will become apparent to those skilled in the art upon consideration of the accompanying disclosure.

SUMMARY OF THE INVENTION

The present invention resides in a method for fabricating ceramic bodies, utilizing alkoxy-derived PLZT powder rich in lead oxide and having a particle size of 75 to 300A and a purity of at least 99.95 percent. It has been discovered that by cold pressure the calcined powder to a compacted body and sintering the body in an oxygen atmosphere at a temperature below 1200°c, fine-grained, transparent bodies with uniform microstructure can be prepared. The high purity, homogeneous precursor PLZT powder is believed to make it possible to fabricate the ceramics under conditions much less rigorous than those previously used. And the fact that less rigorous conditions can be used results in several advantages, including simplification of procedure and less difficulty in maintaining stoichiometry.

In accordance with a preferred embodiment, the alkoxy-derived PLZT powder rich in lead oxide and in amorphous form is initially calcined at 300° to 500°C, preferably at 400° to 500°C, for a period of 30 minutes to 1 hour, thereby converting the powder to a cubic crystalline form. It is important that the calcination be carried out under the indicated conditions. Calcination at higher temperatures and longer periods of time invariably result in massive agglomeration or sintering of the particles. Thereafter, the calcined powder is uniaxially cold pressed at 1000 to 5000 psi for a period of time sufficient to compact the powder to a desired shape. The compacted powder is then isostatically cold pressed at 10,000 to 30,000 psi to provide a compacted body. The cold pressing in each instance is carried out at room temperature. A period of about 5 to 10 minutes for each pressing operation is usually sufficient to obtain the desired compaction. While covered with the calcined PLZT powder, the compacted body is sintered in an oxygen atmosphere at a temperature in the range of 1050° to 1175°C for a period of 4 to 8 hours.

The PLZT powder is prepared by the hydrolytic decomposition of a mixture of lead, lanthanum, zirconium and titanium alkoxides. Thus, there is added to triply distilled, deionized water a solution of lead isoamyloxide and lanthanum, zirconium and titanium alkoxides in isoamyl alcohol. The alkoxides can be represented by the formulas $La(OR)_3$, $Zr(OR)_4$ and $Ti(OR)_4$, where R is individually selected from a group of alkyl radicals containing 3 to 6, inclusive, carbon atoms. The amount of alkoxides in the solution is that required to obtain a product having a desired stoichiometry. The solution is refluxed at a temperature ranging from about 70° to 75°C for a period of about 2 to 5 hours, thereby forming a hydroxide of Pb, La, Zr and Ti. During this period additional lead isoamyloxide is added to the solution to compensate for lead oxide that will be lost by volatilization during the above-described sintering operation. The amount added is usually in the range of about 2 to 10 weight percent of the original quantity of lead isoamyloxide contained in the solution of alkoxides. The hydroxide is recovered by any suitable means, e.g., by filtration, and washed successively with water and an alcohol. The hydroxide is then dried under a vacuum at a temperature of 50° to 70°C, thereby yielding a white, amorphous PLZT powder of high purity and having a particle size of 75 to 300A.

The following formula defines the composition of the PLZT powder:

$$Pb_{1-x}La_x(Zr_yTi_z)_{1-(x/4)}O_3 \quad \text{I}$$

For a PLZT powder to be particularly suitable for fabricating electrooptical ceramics, the ratio of La:Zr:Ti is 10:65:35. At this ratio the above the formula becomes:

$$Pb_{0.9}La_{0.1}(Zr_{0.63375}Ti_{0.34125})O_3 \quad \text{II}$$

The following equations represent the reactions that occur in preparing a PLZT powder having the composition of Formula II:

$$0.9Pb(OR')_2 + 0.1La(OR)_3 + 0.63375Zr(OR)_4 + 0.34125Ti(OR)_4 + 3 H_2O$$

$$\downarrow \text{Excess (xs) } H_2O$$

$$Pb_{0.9}La_{0.1}Zr_{0.63375}Ti_{0.34125}(OH)_6 + 0.3R(OH) + 3.9R(OH) + 1.8R'(OH) + xsH_2O$$

(III)

$$\text{III} \xrightarrow[\text{Vacuum}]{50-70°C} \text{II} + 3H_2O$$

In the foregoing equations, R' is isoamyl while the alkyl radicals represented by R can be the same or different. The alkoxides employed in preparing the PLZT powder are well known compounds that can be prepared by methods described in the literature.

The PLZT powder having the composition represented by Formula II is preferred for preparing electrooptical ceramics. However, ceramics having electrooptical properties can be prepared in which the ratio of La:Zr:Ti is (6–10):65:35. Thus, referring to Formula II, $x$ can equal 0.06 to 0.10 while $y$ and $z$ equal 0.65 and 0.35, respectively. Although the present invention is particularly concerned with the preparation of PLZT ceramics having electrooptical properties, the method is applicable to preparing ceramics from PLZT powders having any desired composition. For example, the ratio of La:Zr:Ti can be (2–20):(10–90):(10–90), where the sum of the ratio of Zr:Ti equals 100. The amounts of the alkoxides required to produce a PLZT powder of desired stoichiometry can be readily calculated from Formula I. At the aforementioned (2–20):(10–90):(10–90) ratio of La:Zr:Ti, the mol ratio of Pb(OR')$_2$:La(OR)$_3$:Zr(OR)$_4$:Ti(OR)$_4$ falls in the following ranges; (.8 to 0.98):(0.02 to 0.2):(0.095 to 0.8964):(0.095 to 0.8964). The specific amount of each compound used depends, of course, upon the particular composition desired.

A more comprehensive understanding of the invention can be obtained by referring to the following illustrative examples which are not intended. however, to be unduly limitative of the invention.

EXAMPLE I

A run was conducted in which PLZT powder with a nominal zirconate-titanate molar ration of 65/35 containing 10 atomic percent of lanthanum was prepared. Initially, a solution of alkoxides was prepared by adding lead isoamyloxide (0.9 mol), lanthanum tris isopropoxide (0.1 mol), zirconium tertiary amyloxide (0.63375 mol) and titanium tertiary amyloxide (0.34125 mol) to isoamyl alcohol. The solution of metal alkoxides was slowly added to triply distilled, deionized water (about 5 mols). The solution was refluxed for a period of 3 hours, thereby hydrolytically decomposing the alkoxides and forming a mixed metal hydroxide. During the reflux period, 10 weight percent of 0.9 mol of lead isoamyloxide was added to compensate for volatilization of lead oxide during subsequent fabrication of the PLZT ceramic.

After recovery of the hydroxide by filtration, it was washed several times, first with high purity water and then with isopropanol. The washed hydroxide was dried under a vacuum at 60°C, yielding a white amorphous PLZT powder.

EXAMPLE II

Samples of the PLZT powder prepared as described in Example I were calcined at 500°C for 30 minutes and 1 hour. The calcined samples were then ground in a B$_4$C mortar to effect comminution of the larger agglomerates. Electron micrographs of the calcined powders were obtained. The electron diffraction patterns indicated a cubic structure. Emission spectrographic impurity analysis for the powders indicated a purity of 99.95 percent.

Utilizing the calcined powder samples, specimens ¾ in. in diameter and ⅛ inch thick were uniaxially coldpressed (room temperature) in a steel die at 1 ksi and 5 ksi. The compacted powder specimens were then isostatically cold pressed at 10 ksi and 30 ksi. The isostatic pressing was carried out by placing the specimens in neoprene bags which were then subjected to the indicated pressures in a hydraulic cylinder. The compacted bodies obtained were completely covered with calcined PLZT powder and sintered in oxygen at temperatures ranging from 1050° to 1175°C for 4 and 8 hours. The sintered bodies approached theoretical density (7.95 g/cm$^3$ for cubic PLZT), routinely reaching 7.94 g/cm$^3$ with good optical transparency. Lettering was clearly visible without distortion through specimens 4 mm thick.

A PLZT ceramic prepared by cold pressing and sintering at 1120°C for 8 hours was thermally etched at 800°C for 30 minutes. The compact showed a finegrained microstructure with internal and grain-boundary porosity virtually non-existent. Bodies fabricated similarly but sintered at higher temperatures (>1200°C) exhibited a microstructure with a much larger grain size.

Wet chemical analysis of the PLZT ceramic with an accuracy of ± 1% for Pb, Zr, Ti and La was performed. The analysis agreed well with the nominal composition of 10/65/35.

EXAMPLE III

A run was conducted in which a ceramic body was prepared by hot pressing. Thus, calcined PLZT powder, prepared as described in Example II was hot pressed in an oxygen atmosphere in $Al_2O_3$ dies at 1275°C and 3 ksi for 16 hours. The compact, which was thermally etched at 800°C for 30 minutes, exhibited a microstructure with a larger grain size than the similarly etched ceramic prepared by cold pressing and sintered at 1120°C for 8 hours. Also the grains of the hot pressed ceramic were not as uniform as those of the cold pressed ceramic. The smaller, more uniform grains of the cold pressed ceramic indicate that it has greater strength than the hot pressed ceramic.

From the foregoing it is seen that the present invention provides a simplified procedure for preparing PLZT ceramic bodies. Furthermore, the ceramics are superior to those prepared by hot pressing in that they have smaller and more uniform grains. The PLZT ceramic bodies of this invention may be used in a variety of applications, including image display, fast speed shutters, light modulators, memory devices and coherent optical data processing.

As will be evident to those skilled in the art variations and modifications of this invention can be made in view of the foregoing disclosure without departing from the spirit and scope of the invention.

We claim:

1. A method for preparing a ceramic body which comprises calcining an alkoxy-derived lead lanthanum zirconate titanate powder rich in lead oxide and having a particle size of 75 to 300A and a purity of at least 99.95 percent by heating the powder at a temperature in the range of 300° to 500°C for a period of 30 minutes to 1 hour; uniaxially cold pressing the calcined powder at 1,000 to 5,000 psi for a period of about 5 to 10 minutes; isostatically cold pressing the resulting compacted powder at 10,000 to 30,000 psi for a period of about 5 to 10 minutes; and sintering the resulting compacted body by heating same, while covered with the powder, in an oxygen atmosphere at a temperature between 1050°–1175°C for a period of 4 to 8 hours.

2. The method according to claim 1 in which the alkoxy-derived powder is the product obtained by hydrolytically decomposing a mixture of lead isoamyloxide, and lanthanum, zirconium and titanium alkoxides, each alkoxide containing 3 to 6, inclusive, carbon atoms; and, after washing the hydroxide obtained, heating same under a vacuum.

3. The method according to claim 2 in which the amounts of lead isoamyloxides and lanthanum, zirconium and titanium alkoxides in the mixture are such as to obtain a product having a desired stoichiometry and lead isoamyloxide in the amount of 2 to 10 weight percent of the amount of lead isoamyloxide in the mixture is added thereto during the hydrolytic decomposition so that said product obtained is rich in lead oxide.

4. A method for preparing a theoretically dense, transparent, polycrystalline body which comprises the steps of adding to triply distilled, deionized water a solution of lead isoamyloxide and lanthanum, zirconium and titanium alkoxides in isoamyl alcohol, the alkoxides containing 3 to 6, inclusive, carbon atoms, and the molar ratio of lead isoamyloxide: lanthanum alkoxide:zirconium alkoxide:titanium alkoxide being 0.9:0.1;0.63375:0.34125; refluxing the solution at a temperature ranging from about 70° to 75°C for a period of about 2 to 5 hours, thereby forming a hydroxide of lead, lanthanum, zirconium and titanium; during the refluxing adding 2 to 10 weight percent lead isoamyloxide, based upon the amount of lead isoamyloxide contained in the solution; recovering the hydroxide; drying the hydroxide by heating same under a vacuum at a temperature in the range of 50° to 70°C, thereby forming a white, amorphous lead lanthanum zirconate titanate powder having a particle size of 75 to 300A and a purity of at least 99.95 percent; calcining the powder by heating same at a temperature in the range of 400° to 500°C for a period of 30 minutes to one hour; uniaxially cold pressing the calcined powder at 1000 to 5000 psi for a period of about 5 to 30 minutes; isostatically cold pressing the resulting compacted powder at 10,000 to 30,000 psi for a period of about 5 to 10 minutes; and sintering the resulting compacted body by heating same, while covered with the powder, in an oxygen atmosphere at a temperature in the range of 1050° to 1175°C; for a period of 4–8 hours and recovering the ceramic body.

* * * * *